Oct. 30, 1928.
T. B. POLK
1,689,967
WINDSHIELD WIPER ACTUATOR
Filed Jan. 26, 1924 2 Sheets-Sheet 1
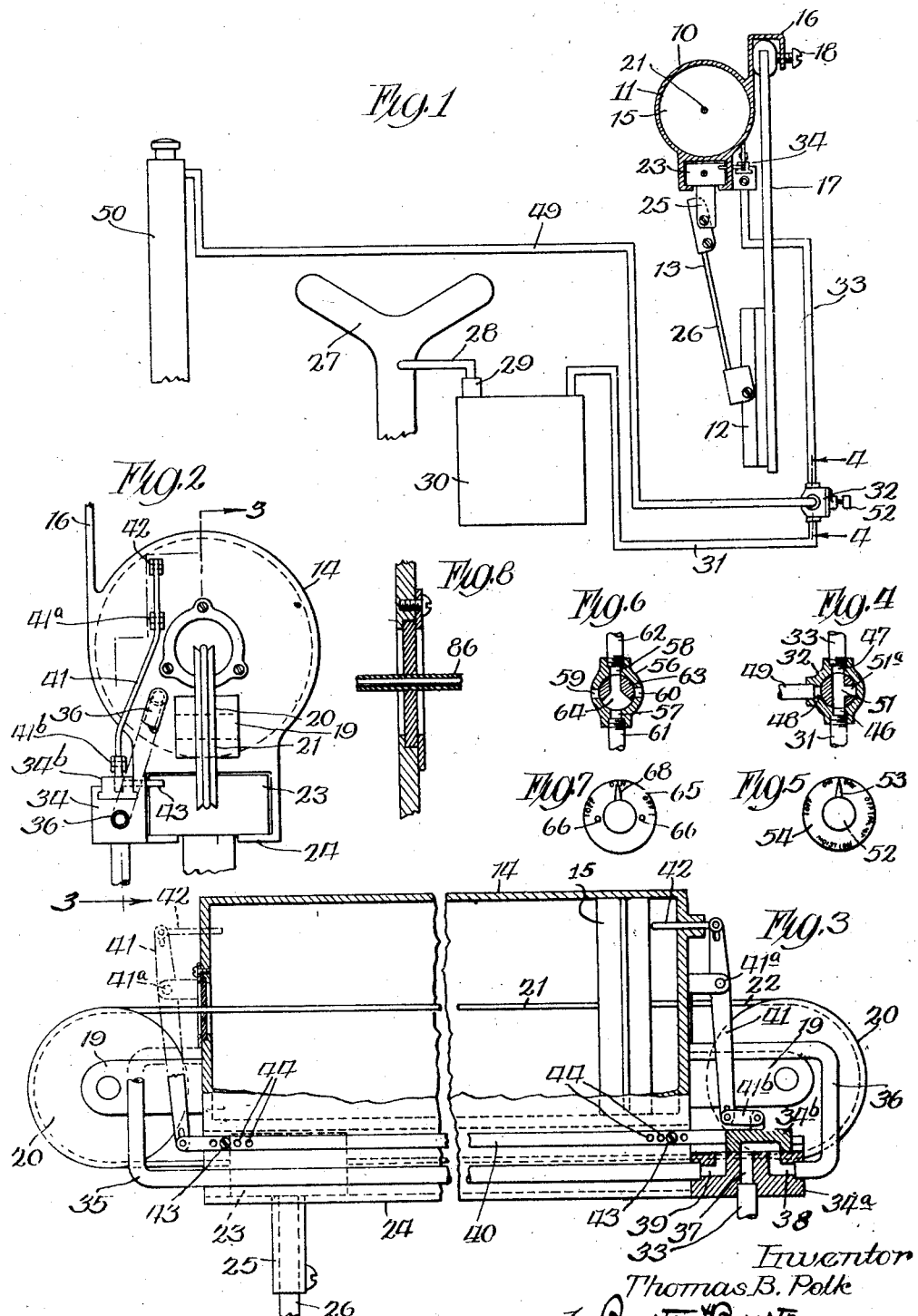
Inventor
Thomas B. Polk Oct. 30, 1928.

T. B. POLK 1,689,967

WINDSHIELD WIPER ACTUATOR

Filed Jan. 26, 1924   2 Sheets-Sheet 2

Inventor:
Thomas B. Polk
by Burton & Burton
Attys

Patented Oct. 30, 1928.

1,689,967

UNITED STATES PATENT OFFICE.

THOMAS B. POLK, OF SEATTLE, WASHINGTON, ASSIGNOR, BY MESNE ASSIGNMENTS, TO TRICO PRODUCTS CORPORATION, OF BUFFALO, NEW YORK.

WINDSHIELD-WIPER ACTUATOR.

Application filed January 26, 1924. Serial No. 688,892.

This invention relates to improvements in automatic windshield cleaning apparatus of the fluid actuated motor type.

One object of the invention is to provide a new and improved construction of fluid motor in apparatus of the class described, which motor may be utilized in operating the wiper element in a straight path across the windshield from side to side thereof.

Further objects of the invention are to provide for a variation in the extent of windshield area cleaned by the wiper; to provide an adjustable mechanism for the fluid actuated motor by which the moment of operation of the valve mechanism for reversing the application of fluid pressure thereto is adjustable relative to the position of the wiper element; to provide a plurality of valve actuating means to insure of the valve mechanism being operated at a definite period, one of said valve actuating means being adjustable to effect an earlier actuation of the valve mechanism for shortening the stroke of the wiper element or its operating part of the motor.

Other objects and advantages will be apparent from the following description taken in connection with the accompanying drawings wherein one form of the invention is illustrated.

In the drawings:

Fig. 1 shows the cleaning apparatus in section operatively mounted on a windshield, the connections between such apparatus and the partial vacuum producing means and between the latter and the radiator of the vehicle being shown diagrammatically.

Fig. 2 is an end elevation of the fluid motor.

Fig. 3 is an irregular vertical axial section thereof about on line 3—3 of Fig. 2.

Fig. 4 is a detail sectional view of the controlling valve, as at 4—4, on Figure 1.

Fig. 5 is a front elevation of the dial and operating member of the valve.

Fig. 6 is a detail sectional view of a slightly modified form of controlling valve, and Fig. 7 is a front elevation of the dial and operating member used in connection with the valve shown in Fig. 6.

Fig. 8 is a longitudinal section taken through one end of the motor cylinder showing one form of packing for the cables in the heads of said cylinder.

Fig. 9 is a view similar to Fig. 3, showing a modification.

Fig. 10 is a detailed sectional view on line 10—10 of Fig. 9.

Referring more in detail to the drawings, the cleaning apparatus is designated in its entirety by reference character 10 and comprises a fluid actuated motor 11, wiper element 12 and supporting means 13 connecting the latter with the motor. The motor comprises an outer stationary cylinder or casing, 14 and a reciprocable piston 15 mounted therein and adapted to move from end to end thereof in a manner to be hereinafter described. The cylinder is provided with a bracket 16, or other suitable supporting member, which engages the windshield 17 of a vehicle, adjusting screws 18 being provided for fastening the same securely in position. A pair of brackets 19 carried at each end of the cylinder supports pulleys 10. Cables 21 and 22 attached to opposite faces of piston 15 extend in opposite directions through the end walls of the cylinder over pulleys 20 and are attached to the slide block 23 operating in guides 24 beneath the cylinder.

In Fig. 8 one form of packing for the cables where the latter extend through the cylinder heads is illustrated. The cable is shown covered with a jacket 80 of rubber, or some other material which will tightly hug the same, seal the irregularities therein and provide a smooth outer surface. An apertured section of rubber or other suitable material which may be rigid or slightly flexible, if desired, is provided in each cylinder head and the cables operate through these sections, the apertures therein being of such size that the jacketed cables fit the same very snugly so that leakage therearound is prevented. The rubber sections may form the entire cylinder heads, or may be smaller and fitted into the heads, as shown. Other forms of packing may, of course, be devised.

Arms 25 depend from the block 23, said arms in turn supporting wiper arm 26 which carries the wiper element 12 at its lower end.

The wiper element 12 engages the glass of the windshield in the usual manner and upon operation of the motor the same is caused to travel back and forth in a straight path across the windshield from side to side thereof through means of the instrumentalities, just described, as will be readily understood.

The cylinder of the motor is connected to a partial vacuum producing means 27, shown herein in the form of the intake manifold of the engine of the vehicle, this connection being through conduit 28, check valve 29, reserve tank 30, conduit 31, control valve 32, conduit 33, reciprocating slide valve 34, and conduits 35 and 36. The seat or fixed member 34$^a$ of the reciprocating slide valve 34 is provided with three ports 37, 38 and 39, port 37 communicating with the partial vacuum source, port 38 through conduit 35 with one end of cylinder 14, and port 39 through conduit 36 with the other end of the cylinder. The movable element 34$^b$ of the valve operates to place the ports 38 and 39 alternately in registration with port 37 for communication with the source of suction or pressure, the port which is not thus registered being for communication with the atmosphere. In this manner, the piston 15 is caused to reciprocate within the cylinder, as will be readily understood.

A control rod 40 underlying the cylinder and slidably supported thereby in any suitable manner is pivotally attached at one end to the movable element of the slide valve 34 for shifting the same at the desired limit of the stroke of the wiper, the slide block 23 being designed to encounter stops 43 carried by said control rod for that purpose. These stops are removably mounted in screw threaded sockets 44, a plurality of which are provided in rod 40 so that said stops may be adjusted along the rod to various positions to alter the timing of the valve and the stroke of the wiper, as desired. If desired, set screws or the like may be employed in connection with stops 43 so as to prevent accidental displacement thereof.

In order to insure the shifting of the valve for reversing the air and pressure or suction connection, in any event, at the end of the piston travel if through improper adjustment or displacement of stops 43, such reversal is not effected by means of said stops, auxiliary reversing mechanism is provided in the form of levers 41 pivotally mounted intermediate their ends, as at 41$^a$, on the cylinder heads, and at their lower ends through pivoted links 41$^b$ are connected with the movable element 34$^b$ of the valve. At their upper ends these levers are provided with pivoted projections or tappets 42, which extend through the cylinder heads for encounter with the piston at the opposite limits of its travel, such encounter serving to operate the valve in the same manner and for the same purpose as it is intended to be operated by the encounter of block 23 with stops 43 of rod 40.

For the maximum stroke of the wiper element the stops 43 will be so positioned on rod 40 as to be engaged by block 23 simultaneously with the engagement of the piston with the tappets or projections 42, but in cases where a shorter stroke is desired block 23 alone will actuate the valve, as will be understood.

The control valve 32 in the form shown in Fig. 1 is of the three-way type, port 46 communicating through conduits 31 and 28 and reserve tank 30 with the intake manifold 27, port 47 through conduit 33 with the motor of the cleaning apparatus and port 48 through conduit 49 with the air space of radiator 50. The passage 51 of the movable element of the valve is provided with a right angle projection 51$^a$ (see Fig. 4), and ports 46, 47 and 48 of the valve are so arranged with relation to these passages that the latter will provide communication between conduits 31 and 33 in one position of the valve member, between conduits 49 and 31 in another position thereof, between both the conduits 49 and 33 and conduit 31, and through the latter with the source of suction in another position of said valve, and in still another position communication through the valve may be entirely shut off. The valve is provided with an operating knob 52, the latter having an indicating element 53 associated therewith and designed to operate over a dial 54, on which dial the various valve positions described in the preceding sentence are designated, respectively, "On dry", "Off moist", "On moist" and "Off". In the first of these positions, the motor is in communication with the suction producing means, as shown in Fig. 4; in the second position the motor is cut off and the suction producing means placed in communication with the moist air supply of the radiator; in the third position, the conduit 31 from the suction producing means is placed in communication with both the motor and the moist air supply resulting in moist air being furnished to the engine while the motor is operating, while in the fourth position communication through the valve is entirely shut off.

When the valve is in either the second or third positions, it will be observed that the partial vacuum producing means is placed in communication with and will draw air from the air space of the radiator, this air containing a certain amount of moisture, and thus tending to enhance power development in the cylinders of the engine, according to well known principles.

From the foregoing it will also be observed that the partial vacuum producing means, after the motor is cut off, by turning the valve to the second or "Off moist" position, will continue to draw air in the same quantity into the intake manifold, this tending to insure a uniform mixture for the engine by maintaining the supply of air to the intake manifold constant regardless of whether or not the cleaning motor is in operation. This arrangement possesses many advantages over the controls now employed in the operation of automatic fluid actuated windshield cleaners, wherein air is drawn into the intake manifold while the motor is being used, but ceases entirely when the cleaner is not in use, thus uniformity in the mixture being charged into the engine is materially affected due to the presence of additional air during the operation of the cleaning apparatus, and the total absence of it when such apparatus is not in use. Furthermore, when this supply of air is cut off the suction in the chamber of the carburetor is increased to a certain extent which also has its effect in disturbing the quality of the mixture.

When the operating element of the valve is turned to the "Off" position, communication through the valve is entirely cut off, and in this position the partial vacuum producing means operating through conduit 28 and check valve 29 acts to exhaust the air from tank 30, thus producing a source of reserve.

In Figs. 6 and 7, a slightly modified form of valve control is illustrated. In these figures, the valve bears reference character 56, the casing thereof being provided with four ports 57, 58, 59 and 60, the latter two communicating directly with the atmosphere, while ports 57 and 58 communicate with conduits 61 and 62, respectively, these conduits corresponding to conduits 31 and 33 of Fig. 1. The movable elements 63 of the valve is provided with a specially formed passage 64 which in one position of said member provides communication between conduits 61 and 62, this position corresponding to the "On" position shown on the dial 65 in Fig. 7, which, when said valve member is moved to either of its other two positions, said passage provides communication between conduit 61 and the outside air, through either one or the other of ports 59 and 60. These two positions are designated "Off" on the dial, which is provided with stops 66 adapted to coact with the pointer 68 of the operating knob for arresting movement of the latter when either of such positions has been reached. Thus, in this form of the invention, the intake manifold is in constant communication with the outside air, such communication being established through the motor when the latter is in operation and through one or the other of ports 59 or 60 when the motor is not in use.

In Fig. 9 another form of valve device is shown for controlling the operation of the fluid motor. The valve device shown in this figure comprises a stationary member, 100, having three ports therein 101, 102 and 103, corresponding to the ports 37, 38 and 39 of the slide valve, previously described. The movable element 104 of this valve is in the form of an oscillating member fulcrumed on a stud 105 which projects from the cylinder and is provided with an upstanding operating arm, 106, to the upper end of which is pivoted a tappet 107 which extends through the cylinder head for encounter with the piston at its limit of travel. The oscillating member of the valve is provided with a groove 108 of such extent as to establish communication between ports 101 and 102 in one position and the ports 101 and 103 in its other position in much the same manner and for the same purposes as previously pointed out in connection with the valve first described. The ports 102 and 103 communicate with opposite ends of the cylinder, respectively, and the port 101 communicates with the pressure or suction producing means. A rod, 109, corresponding to the control rod 40, previously described, is pivotally attached, as at 110, at one end to the oscillating member of the valve so that the slide block which supports the wiper element may also actuate the valve mechanism.

At the opposite end of the cylinder a tappet 107 is connected by a lever 110 fulcrumed between its ends on a stud 105 and at the end opposite its connection with the tappet pivotally connected with the rod 109 so that the piston stroke to the opposite end of the cylinder will operate the valve member 104 to reverse the connections as required and as is done by connection of the tappet 107 to the arm 106 of the oscillating valve member.

The motor construction in Fig. 9 is otherwise substantially similar to that shown in Fig. 3, the same embodying a cylinder 14' enclosing a piston 15' having connected to its opposite sides an endless cable or member 21' which extends through the opposite ends of the cylinder and takes over the pulleys 20' before being connected to the block or carriage 23'. The valve actuating rod 109 is also provided with spaced stops 43' to be engaged by said block 23', and the suction or reduced pressure is communicated to the cylinder from the valve seat by the pipes or conduits 35' and 36'.

The use of the valve just described as distinguished from the one previously described, simplifies the piston actuated reversing mechanism in that it is merely necessary to provide the upper end of the valve with a member for encounter with the piston as distinguished from the pivoted lever and link arrangement, described in connection with the form shown in Fig. 3.

The invention is susceptible of various changes and modifications, and it is accordingly not desired to limit or restrict the same except where limitations appear in the appended claims.

What I claim is:

1. A windshield cleaner comprising a casing, a piston therein, valve means for operatively admitting fluid pressure into the casing at opposite sides of the piston for moving one of said first two named elements relative to the other, first in one direction, and then in the opposite direction, said valve means being operable by and during movement of the movable one of the first two named elements, a wiper operable back and forth by the movable one of said first two named elements, and means for adjusting the operative stroke of said movable element whereby the area cleaned by said wiper may be varied.

2. A windshield cleaner comprising a casing, a piston therein, valve means for operatively admitting fluid pressure into the casing at opposite sides of the piston for moving one of said first two named elements relative to the other, first in one direction and then in the opposite direction, said valve means being operable by and during movement of the movable one of the first two named elements, a wiper operable back and forth by the movable one of said first two named elements, means operable by the said movable element for actuating said valve means, and means independent of said first valve actuating means for predeterminedly varying the moment of operation of said valve means relative to the travel of said wiper and prior to the operation of said first valve actuating means whereby the latter is rendered inoperative.

3. A windshield cleaner comprising a wiper, a motor having a part operable for moving the same first in one direction of movement and then in the opposite direction, automatic reversing means for the motor for effecting a reversal in the application of the driving energy thereto whereby the drive of the motor is first in one direction and then in the opposite direction, and means for varying the extent of movement of the motor part by adjusting the moment of operation of said reversing means relative to the position of said wiper for regulating the stroke of the wiper.

4. A motor for operating a windshield cleaner and the like comprising a cylinder, a piston therein, a guide member carried by the cylinder laterally thereof, an operating implement, a support for said implement mounted on said guide, means connecting said support operatively with the piston for movement thereby parallel to the piston's movement along said guide, conduits opening into the opposite ends of said cylinder, a conduit adapted for connection with a partial vacuum producing means, valve mechanism associated with said conduits for alternately establishing communication between said partial vacuum conduit and one or the other of said first named conduits, and means operable by said support for actuating said valve mechanism, said last named means being adjustable to regulate the stroke of said operating element.

5. A motor for operating a windshield cleaner and the like comprising a cylinder, a piston therein, a guide member carried by the cylinder laterally thereof, an operating implement, a support for said implement mounted on said guide, means connecting said support operatively with the piston for movement thereby parallel to the piston's movement along said guide, conduits opening into the opposite ends of said cylinder, a conduit adapted for connection to a partial vacuum producing means, valve mechanism associated with said conduits for alternately establishing communication between said partial vacuum conduit and one or the other of said first named conduits, and means operable both by said piston and said support for actuating said valve mechanism.

6. An apparatus for the purpose indicated and the like, comprising a cylinder, pulleys supported from opposite heads thereof, a piston mounted for reciprocation in said cylinder, a cable element having ends attached to the opposite ends of the piston and passing through the opposite cylinder heads respectively, and having a ply extending exteriorly of the cylinder parallel thereto; means for operatively applying an operating fluid pressure to the piston for actuating the same, an operating implement carried by said exterior ply, means for preventing leakage around the cable where it extends through the cylinder heads, comprising jackets on the cable made of compressible material, and apertured plates of like material carried by the cylinder heads through whose apertures the cable extends.

7. In a window cleaner, a cylinder, a piston mounted therein for reciprocatory movement; a valve for controlling the reciprocation of said piston; a wiper, a carrier therefor, a flexible band connecting said piston and carrier for synchronous movement, and adjustable valve-actuating means acted upon by said carrier for regulating the length of the strokes of movement of the carrier and piston.

8. A windshield cleaner comprising a cylinder, a piston operable therein upon the application of fluid pressure to the piston within the cylinder, valve mechanism for operatively admitting fluid pressure to the cylinder, said cylinder having a lengthwise extending guide on its periphery, a wiper carrier slidable along the guide and supported thereby on the exterior of the cylinder, and means operatively connecting the carrier to the piston for being driven thereby.

9. A windshield cleaner comprising a cylinder, a piston therein, one of said elements being movable and the other fixed, a wiper, a part reciprocal by the movable element for actuating the wiper, automatic valve mechanism for operatively admitting fluid pressure to the cylinder, means operable by said movable element for actuating the valve mechanism, and other means operable by said part for actuating said valve mechanism, one of said valve actuating means being movable to function ahead of the companion valve actuating means to shorten the stroke of said movable element and said wiper.

In testimony whereof, I have hereunto set my hand at Chicago, Illinois, this 14th day of January, 1924.

THOMAS B. POLK.